Feb. 3, 1970  N. K. F. ZETTERBERG  3,493,906
CONTROL WHEEL FORCE SENSOR
Original Filed Oct. 16, 1967  3 Sheets-Sheet 1

INVENTOR.
NIKLAS K.F. ZETTERBERG
BY
Christie, Parker & Hale
ATTORNEYS.

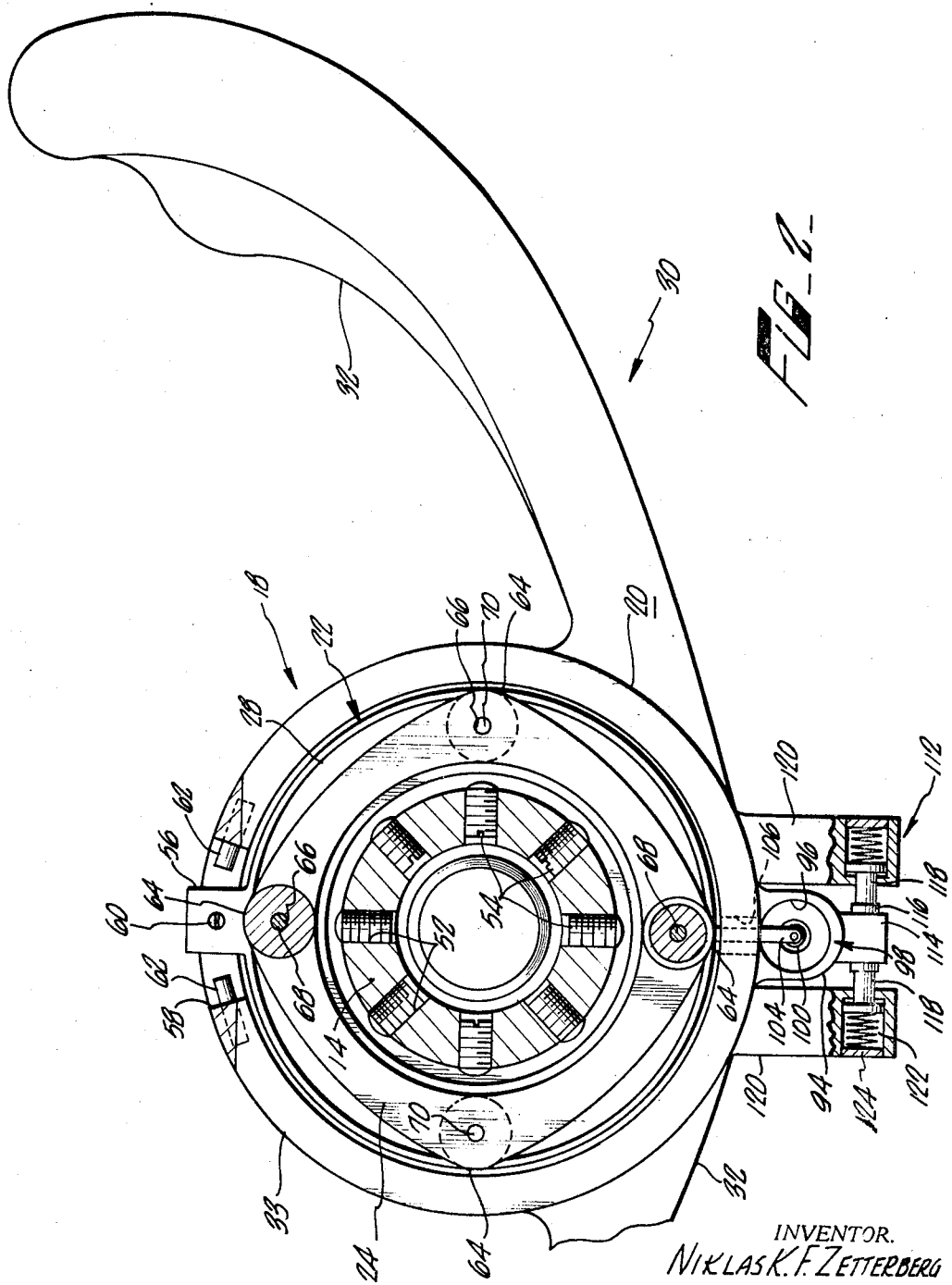

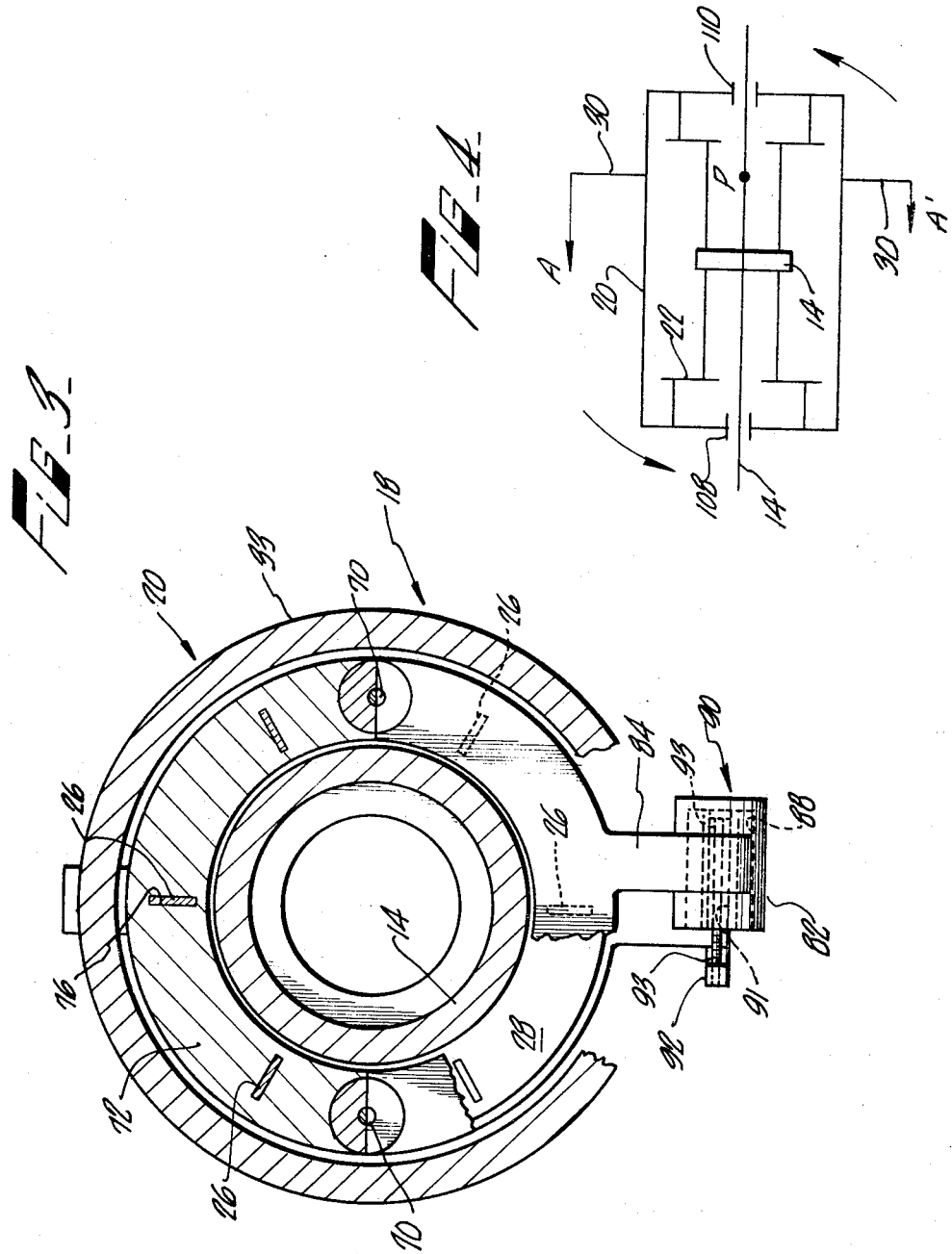

United States Patent Office 3,493,906
Patented Feb. 3, 1970

---

3,493,906
CONTROL WHEEL FORCE SENSOR
Niklas K. F. Zetterberg, Topanga, Calif., assignor to Lear Siegler, Inc., Santa Monica, Calif., a corporation of Delaware
Continuation of application Ser. No. 675,574, Oct. 16, 1967. This application Feb. 19, 1969, Ser. No. 809,449
Int. Cl. H01f 21/02; B64c 13/04
U.S. Cl. 336—30                                                16 Claims

ABSTRACT OF THE DISCLOSURE

A force sensor having a coaxial outer member, a middle member and an inner member. The outer member is subjected to rotational and axial forces applied to a steering member to which it is attached. The forces are transferred to a steering column through first longitudinal springs between the outer and middle member, which longitudinal springs are rigid in a rotational direction and are flexible in an axial or longitudinal direction; and through second rotational springs, which rotational springs are flexible in a rotational direction and are rigid in an axial direction. Stops limit the movements of the members relative to each other. Sensing elements are provided to independently register axial and rotational movements of the outer member. Vibrations and pivotal movements of the outer member, i.e., those movements not parallel to the longitudinal axis, are further limited to a predetermined maximum amount to eliminate overloading of the spring suspension.

---

This application is a continuation of application Ser. No. 675,574 filed Oct. 16, 1967, now abandoned.

BACKGROUND OF THE INVENTION

Field of the invention

This invention relates to wheel force sensing apparatus and more particularly to apparatus for independently sensing axial and rotational movements of a steering member wherein cross readings of the sensing elements from rotational to axial movements of the steering member are substantially eliminated in a unit which withstands eccentric and vibrational loadings.

Description of the prior art

Forces required for steering vehicles, and particularly for today's high-speed large aircraft, are substantial and frequently require the aid of servomechanisms. The servomechanisms supply the actual steering force and are controlled by substantially lesser forces applied by an operator to a force sensing apparatus. One such apparatus is shown and described in U.S. Patent 2,952,426 issued Sept. 13, 1960.

In that patent a steering wheel is secured to a steering column by means of elongated flexible rods which radially extend away from the steering column. Rotation of the steering wheel to roll the aircraft, or axial movement of the steering wheel to pitch the aircraft, deflects the elongater spring rods in one or the other direction. The magnitude and direction of deflection of the spring rods is sensed and electric signals responsive to the deflection of the spring rods control and energize a servomechanism. Additional movement of the steering wheel in either direction engages the steering column and permits the pilot to manaully steer the aircraft in case of an emergency or malfunctioning of the servomechanism.

U.S. Patent 3,114,124, issued Dec. 10, 1963, shows another control wheel force sensor which employs a plurality of flat springs to return the steering wheel to its original position relative to the steering column after forces have been applied thereto. The device there shown reduces the amount of hysteresis incurred since it employs flat leaf springs and helical compression springs for returning the steering wheel to its original position.

Summary of the invention

The present invention provides a wheel force sensor which independently senses axial and rotational forces applied to a steering wheel and which is substantially unaffected by vibrational forces imparted upon it and by eccentric forces applied to the steering wheel. It is adapted to be mounted on a steering column defining a reference axis. Briefly, it comprises an outer member spaced from and coaxially disposed about an inner member. The outer member is adapted to respond to forces applied to a steering member, and includes means for limiting pivotal movements of the outer member about axes not parallel to the reference axis to a maximum predetermined amount. The inner member is adapted to be coaxially coupled to the steering column. A middle member is movable relative to and disposed intermediate the inner member and the outer member. The middle member is secured to the outer and inner members by first spring means and second spring means. The first spring means is flexible in a direction parallel to the reference axis and is rigid in a direction rotational and transverse to the reference axis. The second spring means is flexible in a rotational direction about the reference axis and is rigid in a direction parallel and transverse to the reference axis.

In one preferred embodiment, the first spring means include a pair of flat flexible rings, each having a substantially circular shape, which rings are flexible axially about their centers. The second spring means preferably comprises a plurality of substantially flat elongated leaf springs. In this one preferred embodiment, the inner member is a cylinder coaxially mounted to a steering column and firmly supported in the aircraft by any suitable rigid structure or mounting means. The inner member includes a raised, outwardly-protruding annular section at its midpoint. The raised section includes a plurality of axially oriented slots evenly spaced about its periphery for immovably receiving the flat leaf springs at their midpoints. The middle member comprises a pair of stiff annular rings each of which is oversized with respect to the inner member and each including a plurality of similarly oriented slots facing toward the raised section of the inner member such that one ring each of the middle member is fastened to the respective ends of the flat leaf springs. Once so fastened, the rings of the middle member are supported in a coaxial and spaced relationship from the inner member. The flexible rings of the first spring means are each secured to the outside of the middle member annular rings at a pair of diametrically opposed points; and such flexible rings are further secured to the end flanges of the outer member at another pair of diametrically opposed points equally spaced from the points at which the rings are secured to the middle member.

If forces parallel to the reference axis are applied to the steering wheel, the outer member moves relative to the middle member while the middle member remains rigid and immovable relative to the inner member. Rotational movements of the steering wheel, on the other hand, result in relative movement between the middle and the inner member while the outer member remains rigid and immovable relative to the middle member. Thus, the two command movements are independently sensed and are virtually free of any undesirable cross-feed between individual sensing elements assigned to each command movement of the steering wheel.

Means for independently sensing relative axial movement between the outer member and the middle member; and for independently sensing rotational movement between the middle member and the inner member are further provided.

Stop means are provided for limiting relative rotational and axial movements between the outer member and the inner member in response to forces applied to the steering member. Overstressing of the spring means is prevented since the stop means absorb all forces over and above a predetermined value. The danger of spring hysteresis from high loads applied to the steering wheel is thereby substantially eliminated. Such high loads are a common source of failure of wheel force sensors constructed according to the prior art since they tend to crush, permanently deform or break the springs. Even in the unlikely event of a spring failure, a steering apparatus constructed according to this invention permits manual operation of the aircraft's steering mechanism by virtue of the stop means.

Brief description of the drawings

FIGURE 2 is a fragmentary view, in section, taken along line 2—2 of FIGURE 1;

FIGURE 3 is a fragmentary sectional view taken along lines 3—3 of FIGURE 1, with parts broken away; and FIGURE 4 is a schematic elevational view, in section, of the wheel sensor of the present invention.

Description of the preferred embodiment

Figure 1:
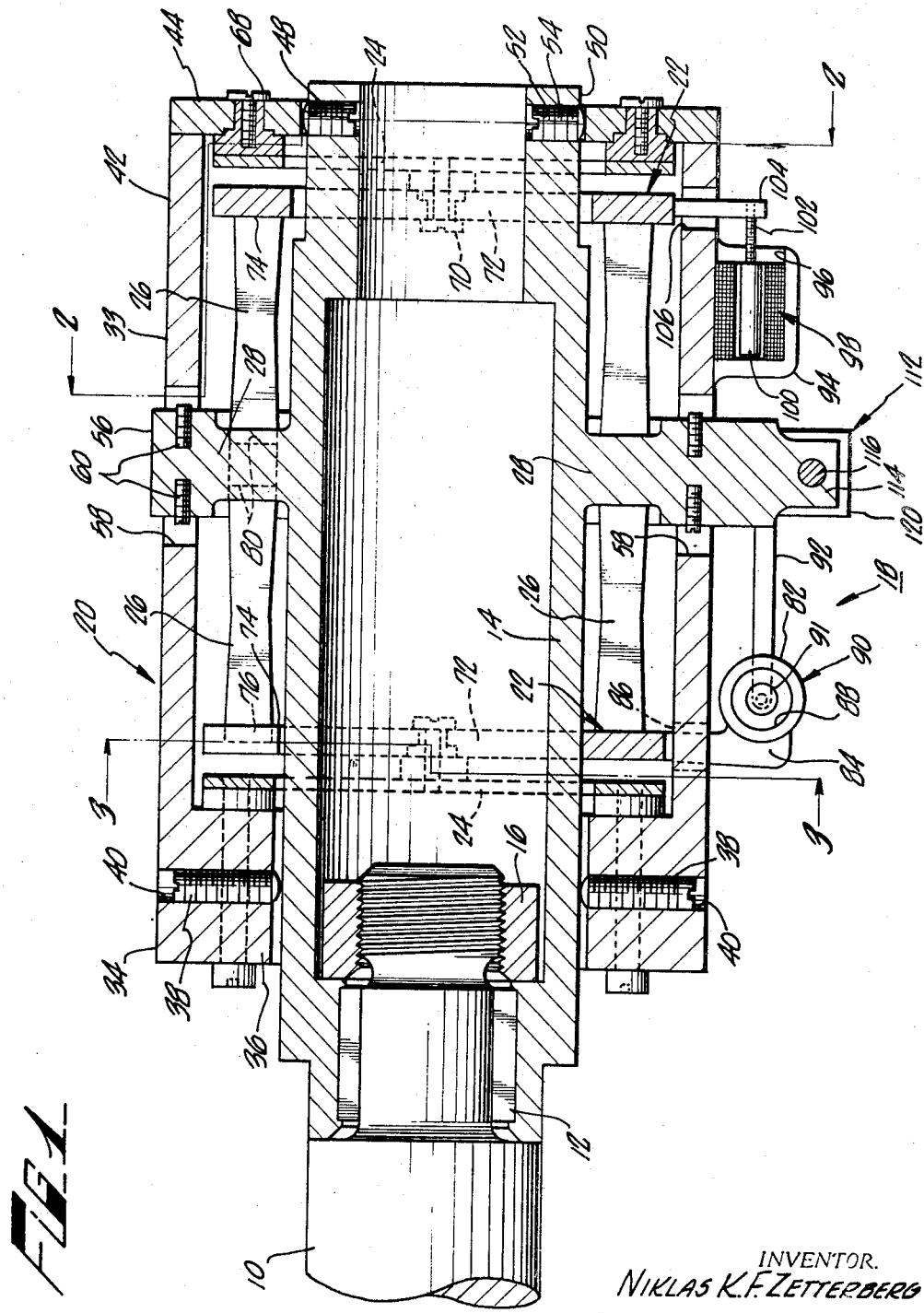
FIGURE 1 is a fragmentary, elevational view, in section, of a steering wheel force sensor constructed in accordance with the present invention and installed on a steering column of an aircraft.

Initially referring to FIGURE 1, a wheel force sensor 18 is mounted on a steering column 10 of an aircraft (not shown) provided with a splined and threaded end 12. An inner member or tubular center core 14 is secured to the steering column by a nut 16. The spline prevents unintentional rotation of the inner member relative to the column 10.

The steering column 10 is further connected with mechanical means (not shown) for actuating control surfaces (not shown) of the aircraft. It is reciprocably movable in a direction parallel to its axis for controlling the pitch or longitudinal inclination of the aircraft. It is rotatable about its axis to roll the aircraft and control the angular inclination of the aircraft's wings (not shown) relative to the horizontal plane.

As best seen in FIGURE 2, a steering wheel 30 having a pair of handles 32 is secured to the periphery of an outer member 20. An instrument panel (not shown) can be secured to the handles for receiving flight control instruments (not shown).

Control wheel force sensor 18 is adapted to actuate the control surfaces of the aircraft by means of a servomechanism (not shown). This enables a pilot of the aircraft to fly it without having to exert substantial physical forces to the steering column when the control surfaces of the aircraft are to be actuated.

The wheel force sensor 18 is mounted about the inner member 14, and principally comprises the outer member 20 which is coaxially disposed about the center core, a middle member 22 disposed intermediate the outer and the inner members, spring rings 24 secured to the outer member and the middle member, and a plurality of flat leaf springs 26 secured to an annular protrusion 28 which is integrally constructed with the inner member and extends radially therefrom towards the outer member 20. The outer member includes preferably a cylindrical tube 33 and an end 34 thereof adjacent the steering column 10 is provided with a flange 36 extending towards the center of the tube. The flange 36 is of sufficient width to extend to adjacent the cylindrical periphery of the core 14. See FIGURE 1. A plurality of radially mounted threaded shafts 38 are secured to the outer member and the flange adjacent the end 34 and extend towards the periphery of the core through threaded holes 40. The shafts can be moved towards the core until they are in engagement with the core's periphery.

An end 42 of the tube 33 opposite the end 34 receives a disc 44 having an outer diameter substantially equal to the outer diameter of the tube. The disc is provided with a circular hole 48 of slightly greater diameter than the outer diameter of the core secured to the steering column 10. A plurality of bolts (not shown) demountably secure the disc to the outer member.

The end 50 of the core includes a plurality of threaded apertures 52 which receive a plurality of threaded shafts 54 extending radially away from the axis of the core. The threaded apertures are axially aligned with hole 48 in disc 44. The shafts are movable in a radial direction from the axis of core 14 by threading them into or out of the threaded apertures 52.

Referring to FIGURE 1, a pair of stop blocks 56 are secured to the periphery of the annular protrusion 28 on core 14 at diametrically opposed locations. The stop blocks extend beyond the outer periphery of the cylindrical tube 33 through apertures 58. A pair of stop pins 60 are threaded into the stop blocks 56 and disposed substantially parallel to the axis of the core. The stop pins protrude beyond ends of the stop blocks but do not contact sides of the aperture 58 facing the stop pins such that the outer member is movable relative to the core or inner member in an axial direction within the limits defined by the stop pins and the aperture. Radial stop pins 62 are threaded into holes (not shown) in side of the aperture 58 which are substantially transverse to the sides of the stop block provided with stop pins 60. See FIGURE 2. The radial stop pins limit the rotational movement of the tube 33 relative to the inner member 14 about the axis of the core.

Referring to FIGURES 1 and 2, the spring ring 24 is shown to be defined by an inner diameter which is greater than the outer diameter of the core end 50. The periphery of the spring ring is defined by four equally spaced points 64 which lie on a circle having as its axis the axis of the inner member 14. Intermediate portions between the points 64 are defined by a curve having a lesser degree of curvature than the circle on which points 64 are located. Intermediate portions of the spring have thereby a lesser width than the portions adjacent points 64. Adjacent each point 64 the spring ring is provided with a hole 66. An opposing pair of holes 66 is secured to disc 44 by a pair of bolts 68. Another pair of bolts 70 extends through the other pair of holes 66 and is secured to an annular ring 72 defining the middle member 22. An annular ring is disposed adjacent each end of the tube 33 and is secured thereto by the spring ring 24 which is axially disposed intermediate the annular ring 72 and flange 36 of disc 44 respectively.

The spring rings have a thickness which is small relative to their width and have a substantially rectangular cross section. When one pair of diametrically opposed holes 66 is immobilized, the spring can be flxed about an axis which is substantially parallel to a line intersecting that pair of holes. At the same time the spring is rigid if a pair of opposing holes 66 is subjected to a rotating force while the other pair of opposing holes if fixed. The annular ring 72 thereby rigidly secures the outer member 20 to the inner member 14 with respect to any forces tending to rotate the outer member. The annular ring 72 remains free to move in an axial direction relative to the inner member if subjected to an axial force because the spring flexes in that direction.

Linear flexture of the spring ring in an axial direction is facilitated and enhanced by reducing its cross section intermediate points 64 and particularly by providing the periphery of the spring intermediate adjacent point 64 with a relatively small curvature. Stress concentrations in the spring adjacent the outer periphery of it are thereby substantially reduced. Such stress concentrations are undesirable because they can cause permanent set in the spring and prevent it from returning to its original zero position after it has been deflected.

A side 74 of each annular ring facing towards the other ring is provided with radially arranged slots 76 which receive ends of the elongated leaf springs 26 disposed substantially parallel to the axis of the inner member 14. Another end of each leaf spring is secured to slots 80 in the annular protrusion 28. The protrusion 28, which is located about midway between ends of the outer member, is provided with a slot 80 on each side such that elongated leaf springs 26 can be disposed intermediate the protrusion and each of the annular rings 72. The leaf springs are secured to the slots by preferably brazing them to the annular rings and to the protrusion. Alternatively, single leaf springs can be provided which have a length substantially equal to the length intermediate the pair of annular rings and which has its center portion disposed in a slot (not shown) extending throughout the axial width of the annular protrusion 28. In this instance, both ends of the leaf springs are secured to the annular rings while an intermediate portion is in engagement with the protrusion.

The plurality of leaf springs 26 are preferably equally spaced from each other and arranged about the outer periphery of the inner member 14. In a preferred embodiment of this invention, the number of leaf springs placed about the inner member is nine to assure that the annular rings 72 are properly centered. A minimum of at least three leaf springs, however, must be disposed about the inner member to assure proper and adequate centering of the annular rings relative to the inner member. Generally, the number of leaf springs is determined on the basis of their desired deflection under a given force applied to the steering wheel 30.

The leaf springs have a width which is substantially greater than their thickness and portions of the spring intermediate annular rings 72 and the center portion 28 of the core 14 preferably have a width which is less than the width of the leaf springs adjacent either the annular ring or the protrusion. Stresses are more evenly distributed if the leaf springs have this configuration and forces in a direction substantially transverse to wide sides of the springs are applied. Moreover, the force required to deflect the spring can in this manner be conveniently altered without having to compromise the strength of the joint between ends of the spring and the annular ring on the one hand and the protrusion on the other hand.

A bracket 84 secures a housing 82 to the periphery of the annular ring 72 adjacent end 34 of the tube 33. The bracket extends beyond the periphery of the tube through a suitable aperture 86. Disposed in an aperture 88 of the housing is a suitable instrument transducer 90 which, in a preferred embodiment of this invention, is a differential transformer having an axially movable center core 91 disposed transversely to the axis of the inner member 14. The mounting bracket and the housing 82 are arranged such that an end of the housing is disposed adjacent an arm 92 secured to an outer end of one of the stop blocks 56. The arm extends from the stop block towards the housing substantially parallel to the axis of core 14. The center core of the differential transformer is secured to an end of the arm such that relative rotational movements between the inner member 14 and the housing 82, and thereby the annular ring 72 of the middle member 22, moves it in a direction substantially parallel to the axis of the differential transformer. Although the relative movements of the center core of the differential transformer and the outer winding thereof are along a circle defined by the point of attachment between the arm 92 and the center core 91 which has as its axis the axis of the inner member 14, over small movements of one to two degrees, the path is substantially linear. Deviations from the linear movements are minute and do not appreciably affect the operation of the differential transformer.

To decrease the effects of the circular path of the center core 91 of the transformer, it can be given flexibility by constructing the center core 91 hollow and securing bolt 93 to the core at its end farthest from arm 92. See FIGURE 3. Any non-linear components in the arm's travel result in flexure of the bolt 93, permitting center core 91 to move linearly in the differential transformer 90.

Referring to FIGURES 1 and 2, a housing 94 is secured to the periphery of tube 33 and includes a cylindrical aperture 96 having an axis substantially parallel to the axis of the inner member 14. Disposed within the cylindrical aperture is a second transducer 98 which preferably is a differential transformer having an axially movable center core 100. The end of the center core adjacent the end of aperture 96 is provided with a shaft 102 secured to an arm 104. The arm is connected with the periphery of the annular ring 72 of the middle member 22 adjacent end 50 of the inner member 14 and extends radially away therefrom through an aperture 106 in the tube 33 adjacent the housing 94. Axial movements between the outer member 20 and the middle member 22 thereby axially displace the center core 100 of the differential transformer 98 relative to the housing 94 and the secondary winding of the transformer.

The differential transformer 90 is connected with a source of electrical power (not shown) and an amplifier (not shown) and emits electric signals responsive to the angular displacement of the center core of the transformer relative to its secondary winding. The center core and the secondary winding of the transformer are adjusted such that no signal is emitted when the middle member 22 is in a neutral position relative to the inner member 14, that is, when no rotating force is applied to the outer member 20 of the wheel force sensor 18 which is transmitted to the annular ring 72 and the spring ring 24. Upon application of a rotating force to the outer member it rotates over a limited arc about the axis of the inner member 14 and the center core 91 is displaced relative to the secondary winding of the differential transformer 90. Increasing displacement of the center core emits signals of correspondingly increasing magnitude which are amplified in the amplifier and which energize a servomechanism (not shown) to actuate the control surfaces of the aircraft controlling the rolling motions thereof.

Similarly, the differential transformer 98 disposed in housing 94 is arranged and adjusted such that when the middle member 22 is in a zero or neutral position relative to the outer member 20, that is, when no axial force is applied to the outer member, no electric signals are emitted by the differential transformer. If, however, an axial force is applied to the outer member, axial displacements between the middle member 22 and the outer member 20 cause a corresponding axial displacement of the center core 100. Electric signals are then emitted in accordance with the magnitude of the axial displacement of the center core 100. These electric signals are amplified in an amplifier (not shown) and are fed into a servomechanism (not shown) which in turn actuates control surfaces of the aircraft used to regulate the angular inclination of the longitudinal axis of the aircraft relative to the horizontal.

Turning now to the operation of the wheel force sensor 18, the sensor is installed onto an end of a steering column 10 used to control pitching and rolling motions of the aircraft. If the pilot desires to roll the aircraft about its longitudinal axis to make a turn, he turns the handles 32 of the steering wheel 30 in the desired direction. If, on the other hand, he wishes to incline the longitudinal axis relative to the horizontal in order to go into a climb or a dive, the handles of the steering wheel are pushed axially towards or away from the steering column. The greater the change in the position of the aircraft the pilot wishes to induce the greater the force he applies onto the steering wheel. Assuming that he wishes to roll the aircraft to the left, he rotates the steering wheel in a counterclockwise direction (as viewed in FIGURE 2). Since it takes a relatively large force to rotate the steering column 10, which would in turn mechanically actuate the control surfaces of the aircraft, the steering column can be considered to be fixed until such time as the force is sufficient to rotate it. While the force is less than the force required to rotate the column, the rotating force is transmitted from the outer member through the spring rings 24 and to the middle member 22 disposed adjacent each end of the outer member. At the same time the annular protrusion 28 remains fixed. The rotational force is transmitted to the leaf springs 26 by a force which acts upon each leaf spring in a direction transverse to the wide sides of the springs. The instant a force is so applied, the leaf springs deflect whereby the outer member 20 together with the middle member 22 rotates relative to the inner member 14 by an amount which is proportional to the rotating force applied to the wheel. This deflection between the middle member and the inner member 14 axially displaces the center core 91 of the differential transformer 90 relative to the secondary winding disposed in housing 82. Signals are thereby emitted which are proportional to the relative angular movement between the middle member 22 and the inner member 14 which in turn are proportional to the force applied to the steering wheel. The signals energize the servomechanism which actuates the control surfaces of the aircraft employed for rolling it about its longitudinal axis. The magnitude of the roll is directly proportional to the force applied to the steering wheel.

To go into a climb or a dive, the steering wheel is pushed inwardly or outwardly relative to the steering column 10. Again, the steering column can be considered fixed relative to the wheel force sensor 18 until a predetermined maximum force has been applied. Until the force reaches this magnitude, the inner member 14 together with the leaf springs 26 and the middle member 22 remain rigid and immovable since the leaf springs cannot be deflected in a direction parallel to the axis of the inner member. Application of the axial force onto the outer member 20 is transmitted to each spring ring 24 which has two opposing points secured to an annular ring 72 and therefore fixed and rigid. The other pair of opposing points of each spring ring are secured to the disc 44 and flange 36, respectively, of the outer member 20 and are subjected to the axial force. The spring ring 24 deflects about an axis substantially transverse to the axis of the inner member 14 under this force. The magnitude of the deflection of the spring rings is directly proportional to the magnitude of the axial force applied to the outer member. The outer member moves parallel to the axis of the inner member 14 as a consequence of the deflection of spring ring 24. At the same time the annular rings 72 of the middle member 22 remain fixed. The axial movement of the outer member, of course, causes housing 94 to move a like amount. The center core 100 of the differential transformer remains immovable with the annular ring, that is, it remains fixed relative to the housing 94 and the outer member 20. The core 100 is therefore axially displaced relative to the housing an amount equal to the axial movement of the housing relative to the inner member 14. This axial displacement of the center core 100 causes the differential transformer to emit signals which change proportionally with the displacement and which, therefore, change proportionally to the magnitude of axial force applied to the steering wheel. The servomechanism in turn actuates the control surfaces of the aircraft controlling the climb or dive position thereof.

To avoid overstressing of the spring rings 24 and the leaf springs 26, the stop pins 60 and 62 are arranged such that they permit a maximum travel between the inner and outer members which is no more than that required for the desired maximum signal output of transducers 90 and 98. In that position the stresses induced into either spring are sufficiently small to prevent any permanent set, or hysteresis, in the springs. Any hysteresis would prevent the transducers from returning to their original or zero position where they do not emit any signals.

The stop means, that is, the stop blocks 56 and the stop pins 60 and 62 limit the travel of the outer member relative to the middle member 22 in an axial direction and of the outer member relative to the inner member 14 in a rotational direction to a maximum predetermined amount. This amount corresponds to the maximum desired travel of the center cores of the differential transformers. In a preferred embodiment of this invention the rotational movement is about one and one-half degrees in either direction from the zero point. The axial movement of the outer member relative to the inner member is about .030 inch in either direction from the zero point. These movements subject the springs to relatively low stresses and prevent high stress concentrations from permanently deforming them, resulting in a shifting of the zero point which, in turn, causes a permanent emission of signals from the differential transformers. This, of course, would adversely affect the flight characteristics of the aircraft and endanger it.

Proper operation of the wheel force sensor 18 is assured even if the pilot subjects the handle 32 of the steering wheel 30 to eccentric forces, that is, to forces which tend to pivot the outer member about any axis P transverse to the axis of the inner member 14 as when he applies an axial force A to only one point of the steering wheel. See FIGURE 4. Such pivotal movement, if allowed, can cause unintended, simultaneous deflection of both the leaf springs 26 and the spring rings 24. These movements are registered by both differential transformers 90 and 98. Therefore, control surfaces for both rolling and pitching movement of the aircraft are actuated. In addition, these forces are often large, as when the operator pulls himself out of his seat by grasping the handles 32 of the steering wheel. Pivotal movements between the inner and the outer member 14 and 20 can subject the spring rings 24 and the leaf springs 26 to excessive stresses. Hysteresis or, in extreme cases, even breakage can result, thereby rendering the control wheel force sensor inoperable.

The pivotal movement of the outer member 20 about axes P is the result of unequal axial forces A and A' applied to the handles of the steering wheel 30. The inequality of the forces causes a movement which tends to pivot the outer member about an axis P which is not parallel to the axis of the inner member 14. Similar movements are induced if the directionality of the forces A, A' is other than parallel to the axis of the inner member. The pivotal movement is only limited by the engagement between the inner member 22 and the outer member 20 at ends 108 and 110 of the outer member. The magnitude of the pivotal movement is reduced by reducing the free distance between the members at these ends to the permissible minimum. The minimum has to be no greater than the required distance to permit relative axial and rotational movements between the inner and the outer member. To assure minimal pivotal movements and to provide for adjustability, the threaded shafts 38 and 54 are arranged to be closely spaced around the inner member 14. If no adjustability is desired, they can of course be replaced by conventional, close fitting bearing sleeves (not shown).

Moreover, the threaded shafts 38 and 54 substantially reduce any movements of the outer member 20 under high levels of vibration. Such vibrational forces cause fatigue and can damage or break the springs. Such vibrational movements of the outer member can also induce relative movements of the center cores 91 and 100 of the transformers 90 and 98 which, in turn, result in the emission of undesired and unintended signals therefrom.

Referring to FIGURE 2, a stabilizer 112 prevents movement of the outer member 20 under minimal forces. Without the stabilizer the differential transformers 90 and 98 emit signals if a force of only a few ounces is applied to the steering wheel 30. Frequently the aircraft's pilot rests his hands on the handles 32 of the wheel without the intention of changing the aircraft's direction. With the stabilizer 112 a predetermined minimum force must be applied before the control wheel force sensor is operated. Experience has shown that the minimum force is preferably between about 10 and about 25 pounds.

The stabilizer includes a center post 114 secured to the inner member 14 and preferably constructed integrally with the annular protrusion 28 and a stop block 56. It projects past the outer member 20 and has a pair of aligned bosses or pins 116. The bosses are engaged by axially aligned bolts 118 which are axially movably mounted in a mounting bracket 120 connected with the outer member and disposed parallel to the center post adjacent each boss 116. A compression spring 122 is retained in each bracket by a closure 124 and exerts an axial force on each bolt 118. The force exerted by each spring is equal such that they maintain the center post 114 in its neutral position between the brackets 120. The outer member 20 is also in its neutral position such that no signals are emitted by the transducer 90. The transducer can only exert signals after an operator applies a force of a sufficient magnitude to the wheel to overcome the force of one of the springs 122. Signal emissions from light, unintentional contact with the steering wheel 30 are thereby eliminated. A similar stabilizer (not shown) is provided to require the application of a minimal axial force before axial movements of the outer member relative to the inner member 14 can take place. It is constructed identically to the stabilizer 114 and is therefore not illustrated in the drawings or further described herein.

It is to be understood that the foregoing features and principles of this invention are merely descriptive, and that many departures and variations thereof are possible by those skilled in the art, without departing from the spirit and scope of this invention.

What is claimed:

1. A force sensor for independently sensing translational and rotational forces applied to a steering element relative to a reference axis of a mounting element, the sensor comprising:
    an inner member disposed along the reference axis;
    an outer member disposed about the inner member, one of the members being adapted to receive forces applied to the steering element;
    a middle member movable relative to and disposed intermediate the inner and the outer members;
    first means elastically flexible in a translational direction parallel to the reference axis and rigid in a rotational direction about the reference axis, the first means coupling the middle member to one of the other members;
    second means elastically flexible in a rotational direction about the reference axis and rigid in a translational direction parallel to the reference axis, the second means coupling the middle member to the remaining member; and
    means for independently sensing relative translational movements between the middle member and the one member and rotational movements between the middle member and the remaining member.

2. The force sensor of claim 1, in which means are provided for limiting to a maximum predetermined amount the pivotal movements of the member adapted to receive the forces applied to the steering element about axes transverse to the reference axis.

3. The force sensor of claim 2, in which the limiting means are adjustable to vary the maximum predetermined amount.

4. The force sensor of claim 3, in which the limiting means includes a plurality of at least three radially disposed threaded shafts adjacent each end of the outer member, the ends of the shafts forming the bearing surfaces between the outer and inner members.

5. The force sensor of claim 3, in which the second means comprises a plurality of at least three substantially flat, elongated leaf springs disposed about the reference axis in substantially parallel relationship therewith, each leaf spring being secured to the middle member and the remaining member.

6. The force sensor of claim 5, in which the remaining member is the inner member and the first means includes a ring having a substantially rectangular cross section, the ring being secured to the middle member at a pair of diametrically opposed points and to the outer member at a pair of diametrically opposed points equally spaced from the points at which the ring is secured to the middle member.

7. The force sensor of claim 6, in which the inner circumference of the ring is substantially circular and the width of the ring adjacent the opposed points is greater than the width of the ring intermediate the opposed points.

8. The force sensor of claim 7, in which the width of the leaf springs adjacent the inner member and the middle member is greater than the width of the leaf springs intermediate the inner member and the middle member.

9. The force sensor of claim 1, in which the middle member comprises a pair of annular rings adjacent each end of the outer member, the inner member has a radial protrusion intermediate the annular rings, the outer member has an opening through which the radial protrusion extends to form stops on the relative movement between the inner and outer members, and the elastically flexible means coupled to the inner member is secured to the radial protrusion.

10. The force sensor of claim 1, in which stop means are provided for limiting relative movement between the outer and inner members in response to forces applied to the steering element.

11. The force sensor of claim 10, in which the mounting element is a steering column that is fixed until the limited relative movement between the inner and outer members esstablished by the stop means is reached, after which the steering column is movable in a translational direction coincident with the reference axis and a rotational direction about the reference axis.

12. Apparatus for emitting signals responsive to translational and rotational forces applied to an aircraft control wheel, the apparatus comprising:
    an elongated, cylindrical inner member disposed about a reference axis;
    an elongated, cylindrical outer member coaxially disposed about the inner member;
    a steering column secured to one of the members;
    a control wheel secured to the other member;
    an intermediate member coaxially disposed between the outer and inner members;
    a first spring connected between the intermediate member and one of the other members, the first spring being deflectable in a translational direction parallel to the reference axis and being rigid in a rotational direction about the reference axis so as to absorb translational forces an transmit rotational forces;
    a second spring connected between the intermediate member and the remaining member, the second spring being deflectable in a rotational direction about the reference axis and being rigid in a translational direction parallel to the reference axis so as to absorb rotational forces and transmit translational forces;
    means for emitting an electrical signal indicative of the relative translational movement between the intermediate member and the one member; and means for emitting an electrical signal indicative of the relative rotational movement between the intermediate member and the remaining member.

13. The apparatus of claim 12, in which the member to which the control wheel is secured is restrained against pivotable movements about axes transverse to the reference axis.

14. The apparatus of claim 12, in which stops are formed to limit the relative rotational and translational movements between the inner and outer members.

15. The apparatus of claim 14, in which the steering column is supported so it remains fixed while relative movement between the inner and outer members takes place which is less than the limited movement established by the stops and so it moves after the stops are met.

16. The apparatus of claim 12, in which a first stabilizer is connected between the intermediate member and the one other member to prevent relative movement therebetween responsive to forces below a predetermined value and a second stabilizer is connected between the intermediate member and the remaining member to prevent relative movement therebetween responsive to forces below a predetermined value.

References Cited

UNITED STATES PATENTS

| | | | |
|---|---|---|---|
| 3,114,124 | 12/1963 | Miller | 336—30 |
| 3,251,013 | 5/1966 | Klem et al. | 336—30 |

MILTON KAUFMAN, Primary Examiner

U.S. Cl. X.R.

74—471; 244—83